(12) United States Patent
Fujita

(10) Patent No.: US 7,231,591 B2
(45) Date of Patent: Jun. 12, 2007

(54) COMPUTER SYSTEM SUITABLE FOR COMMUNICATIONS OF STRUCTURED DOCUMENTS

(75) Inventor: Satoru Fujita, Tokyo (JP)

(73) Assignee: NEC Corporation, Tokyo (JP)

(*) Notice: Subject to any disclaimer, the term of this patent is extended or adjusted under 35 U.S.C. 154(b) by 392 days.

(21) Appl. No.: 10/813,043

(22) Filed: Mar. 31, 2004

(65) Prior Publication Data

US 2004/0268239 A1    Dec. 30, 2004

(30) Foreign Application Priority Data

Mar. 31, 2003    (JP) ............................. 2003-094281

(51) Int. Cl.
*G06F 15/00*    (2006.01)
*G06F 15/16*    (2006.01)
*G06F 17/00*    (2006.01)

(52) U.S. Cl. ..................... 715/500; 715/513; 715/516; 709/247; 707/100; 707/101; 707/103 R

(58) Field of Classification Search .............. 715/513, 715/516, 500; 707/100–101, 103 R, 103; 709/247
See application file for complete search history.

(56) References Cited

U.S. PATENT DOCUMENTS

| | | | |
|---|---|---|---|
| 6,922,697 B1* | 7/2005 | Suehira | 707/102 |
| 6,966,027 B1* | 11/2005 | Krasinski | 715/513 |
| 7,089,543 B2* | 8/2006 | Rising, III | 717/144 |
| 2002/0138518 A1* | 9/2002 | Kobayashi et al. | 707/513 |
| 2003/0149934 A1* | 8/2003 | Worden | 715/513 |
| 2004/0028049 A1* | 2/2004 | Wan | 370/394 |

FOREIGN PATENT DOCUMENTS

| | | |
|---|---|---|
| JP | 8-190560 | 7/1996 |
| JP | 10-214265 | 8/1998 |
| JP | 2001-75958 | 3/2001 |
| JP | 2001-217720 | 8/2001 |
| JP | 2001-331479 | 11/2001 |
| JP | 2002-163248 | 6/2002 |
| JP | 2002-244894 | 8/2002 |

* cited by examiner

*Primary Examiner*—William Bashore
*Assistant Examiner*—Chau Nguyen
(74) *Attorney, Agent, or Firm*—McGinn IP Law Group, PLLC

(57) ABSTRACT

A computer system is composed of sending and receiving computers. The sending computer includes an encoder module encoding an internal representation of a structured document to generate an encoded document. The receiving computer includes a decoder module which receives the encoded document through a network, and decodes the encoded document to reproduce the internal representation. The encoder module lists texts and structures included within the structured document without duplication to thereby generate validation information, and incorporates the validation information into the encoded document. The decoder module includes a validation module which is responsive to the validation information to validate whether a data structure of the reproduced internal representation is in compliance with a predetermined document type declaration.

7 Claims, 15 Drawing Sheets

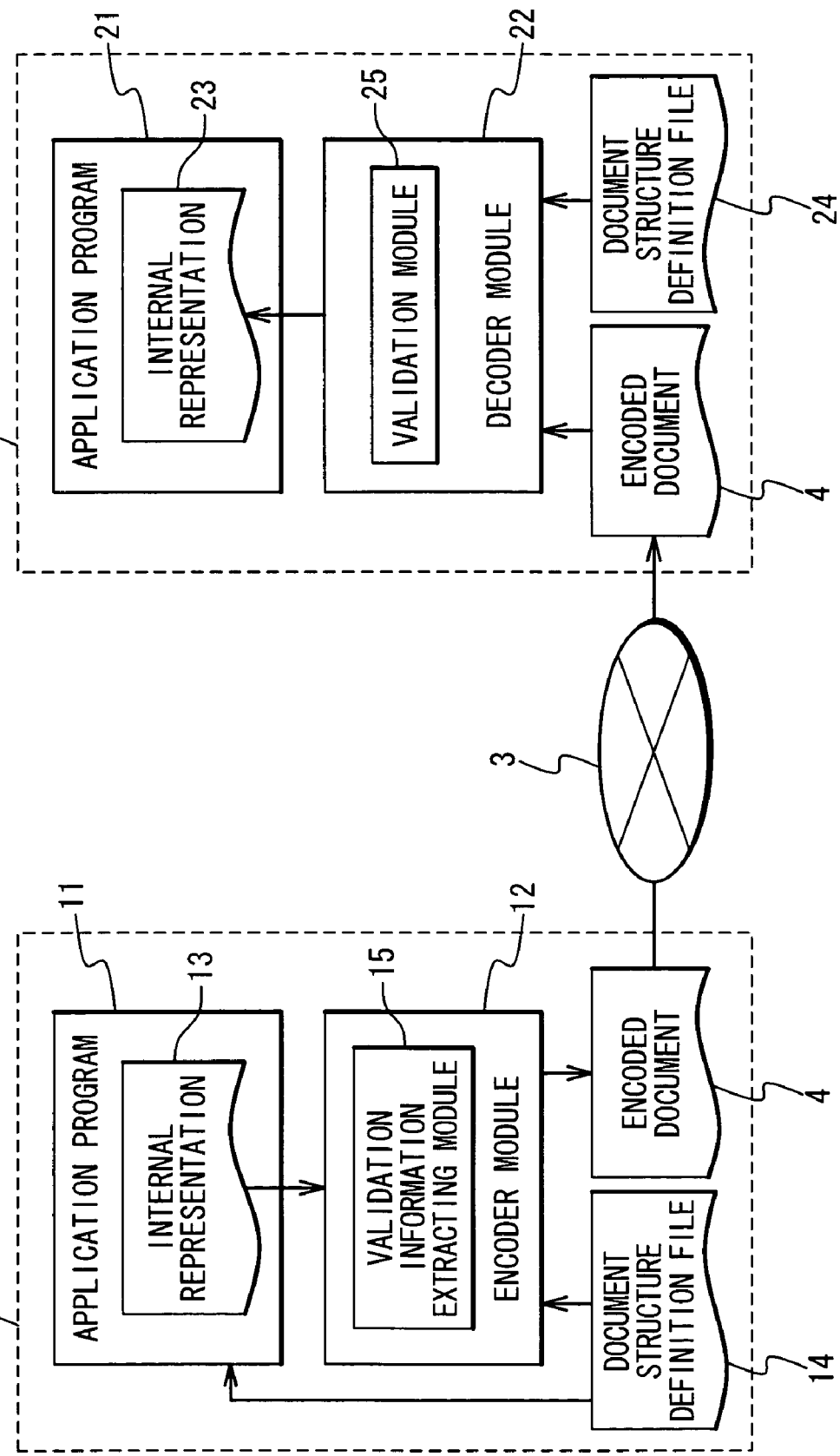

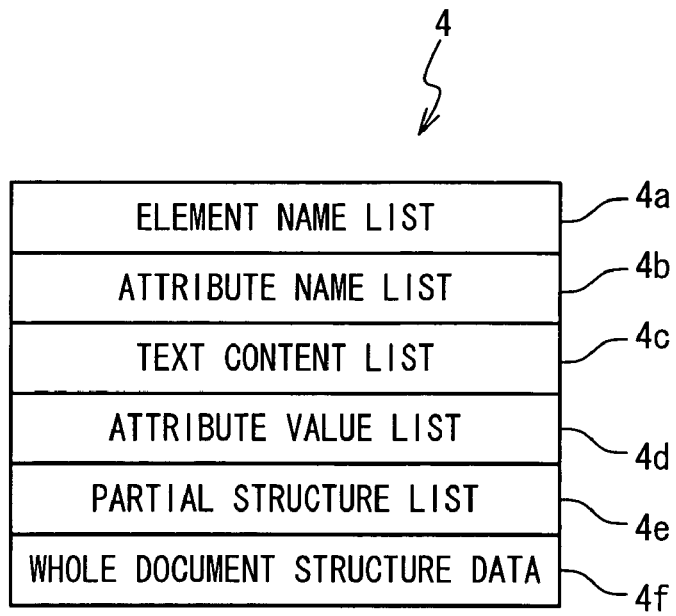

| ATTRIBUTE ID | ATTRIBUTE NAME |
|---|---|
| A01 | ATTRIBUTE-NAME-A |
| A02 | ATTRIBUTE-NAME-B |
| A03 | ATTRIBUTE-NAME-C |
| A04 | ATTRIBUTE-NAME-D |
| ... | ... |

| ELEMENT ID | TEXT ID | TEXT CONTENT |
|---|---|---|
| E01 | T01 | TEXT-A |
| E01 | T02 | TEXT-B |
| E01 | T03 | TEXT-C |
| E02 | T04 | TEXT-D |
| ... | ... | ... |

| ATTRIBUTE ID | TEXT ID | ATTRIBUTE VALUE |
|---|---|---|
| A01 | T05 | TEXT-A |
| A01 | T06 | TEXT-B |
| A01 | T07 | TEXT-C |
| A02 | T08 | TEXT-D |
| . . . | . . . | . . . |

| STRUCTURE ID | PARTIAL STRUCTURE REPRESENTATION |
|---|---|
| S01 | E01 A01 E02 E02 |
| S02 | E02 E03 E06 E10 |
| S03 | E03 E04 E05 |
| S04 | E04 T |
| . . . | . . . |

Fig. 14

```
<AddressBook owner="Suzuki">
  <Person>
    <Name>
      <LastName>Yamada</LastName>
      <FirstName>Taro</FirstName>
    </Name>
    <Address>
      <Country>Japan</Country>
      <Prefecture>Kanagawa</Prefecture>
      <City>Yokohama</City>
    </Address>
    <Telephone>045-123-4567</Telephone>
  </Person>
  <Person>
    <Name>
      <LastName>Yamada</LastName>
      <FirstName>Jiro</FirstName>
    </Name>
    <Address>
      <Country>Japan</Country>
      <Prefecture>Kanagawa</Prefecture>
      <City>Kawasaki</City>
      <Ward>Miyamae</Ward>
    </Address>
  </Person>
</AddressBook>
```

Fig. 15

| ELEMENT ID | ELEMENT NAME |
|---|---|
| E01 | AddressBook |
| E02 | Person |
| E03 | Name |
| E04 | LastName |
| E05 | FirstName |
| E06 | Address |
| E07 | Country |
| E08 | Prefecture |
| E09 | City |
| E10 | Telephone |
| E11 | Ward |

Fig. 16

| ATTRIBUTE ID | ATTRIBUTE NAME |
|---|---|
| A01 | owner |

Fig. 17

| ELEMENT ID | TEXT ID | TEXT CONTENT |
|---|---|---|
| E04 | T01 | Yamada |
| E05 | T02 | Taro |
| E05 | T03 | Jiro |
| E07 | T04 | Japan |
| E08 | T05 | Kanagawa |
| E09 | T06 | Yokohama |
| E09 | T07 | Kawasaki |
| E10 | T08 | 045-123-4567 |
| E11 | T09 | Miyamae |

Fig. 18

| ATTRIBUTE ID | TEXT ID | ATTRIBUTE VALUE |
|---|---|---|
| A01 | T10 | Suzuki |

Fig. 19

| STRUCTURE ID | PARTIAL STRUCTURE REPRESENTATION |
|---|---|
| S01 | E01 A01 E02 E02 |
| S02 | E02 E03 E06 E10 |
| S03 | E03 E04 E05 |
| S04 | E04 T |
| S05 | E05 T |
| S06 | E06 E07 E08 E09 |
| S07 | E07 T |
| S08 | E08 T |
| S09 | E09 T |
| S10 | E010 T |
| S11 | E02 E03 E06 |
| S12 | E06 E07 E08 E09 E11 |
| S13 | E11 T |

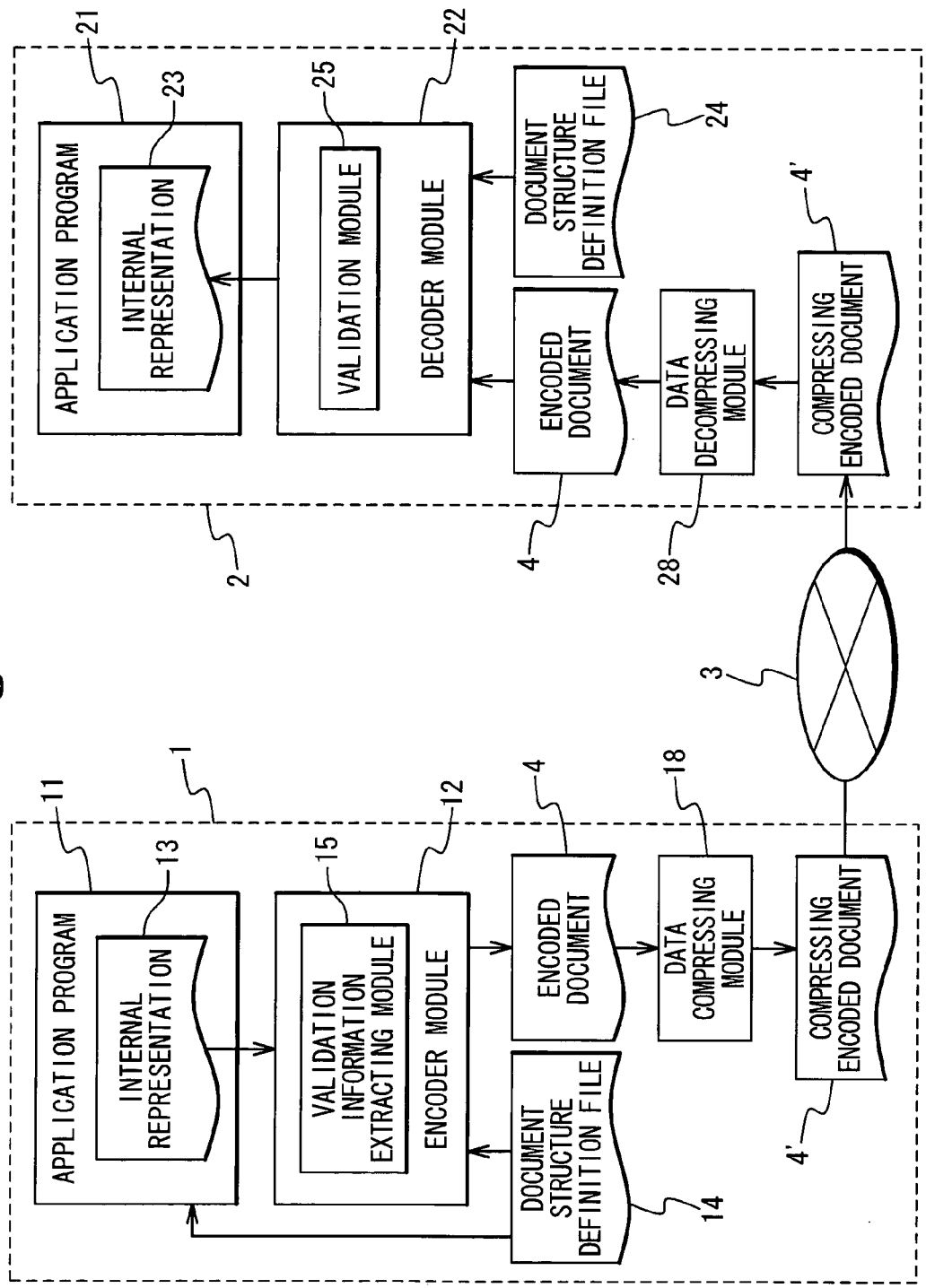

COMPUTER SYSTEM SUITABLE FOR COMMUNICATIONS OF STRUCTURED DOCUMENTS

BACKGROUND OF THE INVENTION

1. Field of the Invention

The present invention is generally related to a computer system, more particularly, to communications of structured documents (or structured texts) between computers.

2. Description of the Related Art

Structured documents, such as XML and SGML documents, designate documents into which data structure information thereof is incorporated therein. In order to describe the data structure thereof, structured documents include symbols called "tag". Structured documents have advantages of improved flexibility and expandability in the data structure, and these advantages promote the use of structured documents for data exchange between different computers or different applications.

Structure of a structured document is defined in a document type definition. For example, a document type definition (DTD) or an XML schema is typically used as a document type definition of an XML document. A document type definition may be incorporated into the structured document, or independently prepared for the associated structured document. An independently prepared file that describes a document type definition of a structured document is referred to as a document structure definition file.

A structured document is required to be in compliance with a document type definition. A structured document not in compliance with the document type definition may cause a computer to incorrectly recognize the contents of the structured document.

Therefore, there is a need for validating a structured document. Nishioka et al. disclose a structured document processor for validation of structured document in Japanese Open Laid Patent Application No. Jp-A 2001-75958 discloses. The disclosed structured document processor is provided with validation libraries for validating whether a structured document is in compliance with a document structure declaration.

Atsumi discloses a structure testing apparatus for validating structured documents in Japanese Open Laid Patent Application No. Jp-A-Heisei 8-190560. The disclosed testing apparatus is composed of a test data generating module which generates a document structure table from a structured document to list element IDs, element names, and contents of the elements, and a structure test module which validates the structured document using the document structure table.

One of the problems in validation of structured documents is that a considerable amount of processing is required for validation. Structured documents tend to be large in size and to have many repeated structures. The increased size and repetition of structured documents undesirably increases the amount of processing for validation, and thus increases the validation cost.

This problem is especially serious in transferring a structured document between computers. When a structured document is transferred between computers, the structured document is preferably validated by not only the sending computer but also the receiving computer, because a communication error may invalidate the structured document received by the receiving computer. Nevertheless, performing validation check of a structured document in both of the sending and receiving computers undesirably increases the amount of processing for confirming validity of the document.

Other techniques are disclosed for encoding or processing structured documents as follows. Firstly, Imaoka discloses a method for encoding XML data in Japanese Open Laid Patent Application No. Jp-A 2002-244894. The disclosed encoding method involves converting a DTD into a type described in an ASN.1 abstract syntax, dividing XML data into the element contents and structure thereof, converting the structure into values described in the ASN.1 abstract syntax, converting the values into an ASN.1 transfer syntax, compressing the element contents, and incorporating the compressed element contents and the ASN.1 transfer syntax.

Liefke and Suciu disclose a method for efficiently compressing XML documents in "XMill: an Efficient Compressor for XML Data" in proceedings of ACM SIGMOD Symposium on the Management of Data, 2000. This method discloses that XML documents are first divided into text and structure regions, the texts are classified by text types, duplicated texts are eliminated, and then the whole texts are compressed separately by their types. This method succeeded on efficient compression of XML documents in size, but did not mention about compression for reducing validation cost.

David Mertz discloses similar compression technologies of XML documents in http://www-6.ibm.com/jp/developerworks/xml/020125/j_x-matters13.html, but he did neither mention about the compression for reducing validation cost.

Satoh discloses a structured document processing system for efficiently compressing structured documents and reducing the amount of processing necessary for tag analysis in Japanese Open Laid Patent Application No. Jp-A 2002-163248. The structured document processing system includes a set of structured document compressing and uncompressing units. The compressing unit includes a tag list generating module generating a common tag list used for a plurality of structured documents, a compression module generating compressed documents of the plurality of structured document through replacing tags with delimiter codes, and an output module incorporating the tag list and the compressed documents to develop a compression result document. The decompressing unit includes a reproducing module reproducing a data structure from the tag list, and a write module reproducing the element contents from the compressed documents so as to associate the positions of the tags in the compressed documents with those of the tags in the data structure.

Maruyama discloses a data compression apparatus for structured documents in Japanese Open Laid Patent Application No. 2001-217720. The disclosed compression apparatus includes an encoder which divides tree-structured documents into the structure and contents to encode the structure, and a compression processor compressing the contents of the document.

Nishioka discloses an XML data converter in Japanese Open Laid Patent Application No. 2001-331479, the XML data converter including planarizing means for planarizing a DTD, DTD graph generating means for generating a DTD graph from the planarized DTD, schema generating means for generating a schema of an object relational model from the DTD graph, XML document generating means for generating a well-structured XML document for the planarized DTD, and object relational model generating means for data of the object relational model from the well-structured XML document.

Finally, Imaoka et al. disclose a structured document processor in Japanese Open Laid Patent Application No. Jp-A-Heisei 10-214265. The disclosed processor includes document structure analyzing means for analyzing an input document to generate an input document tree structure, document processing instruction interpreter means for interpreting and executing instructions to generating an output document tree structure from the input document tree structure, and structured document reproducing means for reproducing an output document from the output document tree structure.

However, no prior art is concerned on communications of structured documents with reduced amount of processing necessary for validation of structured documents.

SUMMARY OF THE INVENTION

Therefore, the present invention generally addresses reduction in the amount of processing necessary for validation of structured documents.

In detail, an object of the present invention is to provide a computer system which allows communications of structured documents with reduced amount of processing for validation.

In an aspect of the present invention, a computer system is composed of sending and receiving computers. The sending computer includes an encoder module encoding an internal representation of a structured document to generate an encoded document. The receiving computer includes a decoder module which receives the encoded document through a network, and decodes the encoded document to reproduce the internal representation. The encoder module lists texts and structures included within the structured document without duplication to thereby generate validation information, and incorporates the validation information into the encoded document. The decoder module includes a validation module which is responsive to the validation information to validate whether a data structure of the reproduced internal representation is in compliance with a document type declaration.

The validation information preferably includes a text content list which lists text contents of text-including elements described in the internal representation without duplication for the identical elements. In this case, it is advantageous if the document type declaration includes an element type declaration which defines types of the text-including elements, and the validation module validates whether the text-including elements are in compliance with the defined types.

It is also preferable that the validation information includes an attribute value list which lists attribute values of attributes associated with elements described in the internal representation without duplication for the identical attributes. In this case, it is advantageous if the document type declaration includes an attribute type declaration which defines attribute types of the attributes, and the validation module validates whether the elements having the attributes are in compliance with the defined attribute types.

It is also advantageous if the validation information includes a partial structure list which lists partial structures within the internal representation without duplication. In this case, the validation module preferably validates whether the partial structures are in compliance with a syntax defined in the document type declaration.

In a preferred embodiment, the validation information includes an element name list which lists element names of elements described in the internal representation, an attribute name list which lists attribute names of attributes used in the internal representation, an text content list which lists text contents of text-including elements out of the elements described in the internal representation without duplication, and an attribute value list which lists attribute values of the attributes used in the internal representation. In this case, the partial structures are respectively associated with structure IDs, and the text contents and the attribute values are respectively associated with text IDs in the text content list and the attribute value list. Each of the partial structures is described in the partial structure list using an element ID of an associated parent element described in the internal representation, an attribute ID of an attribute associated with the parent element, an element ID of a child element of the parent element, and a symbol which represents that the parent element have a text content. The encoded document includes a whole structure data describing a whole structure of the internal representation using the structure IDs, and the text IDs, and the decoder module reproduces the internal representation using the element name list, the attribute name list, and the whole structure data list.

In another aspect of the present invention, a method for transmitting a structured document includes:

encoding an internal representation of the structured document to generate an encoded document;

receiving the encoded document through a network; and decoding the encoded document to reproduces the internal representation. The encoding includes listing texts and structures of the structured document without duplication to generate validation information, and incorporating the validation information into the encoded document, while the decoding includes validating based on the validation information whether the internal representation to be reproduced is in compliance with a predetermined document type declaration.

In still another aspect of the present invention, a computer readable program is composed of:

listing texts and structures of a structured document without duplication to generate validation information; and encoding an internal representation of the structured document to generate an encoded document, wherein the encoded document includes the validation information.

In yet still another aspect of the present invention, a computer readable program is composed of:

decoding an encoded document received from a network, the encoded document including validation information in which texts and structures of a structured document are listed without duplication. The decoding includes validating based on the validation information whether an internal representation of the structured document to be reproduced is in compliance with a predetermined document type declaration, and reproducing the internal representation from the encoded document.

BRIEF DESCRIPTION OF THE DRAWINGS

FIG. 1 is a block diagram of a computer system in an embodiment in accordance with the present invention;

FIG. 2 is a table illustrating contents of an encoded document used in this embodiment;

FIG. 3 is a table illustrating contents of an element name list;

FIG. 4 is a table illustrating contents of an attribute name list;

FIG. 5 is a table illustrating contents of an element text list;

FIG. 6 is a table illustrating contents of an attribute value list;

FIG. 7 is a table illustrating contents of a partial structure list;

FIG. 14 illustrates an example of an XML document to be transmitted between sending and receiving computers;

FIG. 15 illustrates contents of an element name list generated from the XML document shown in FIG. 14;

FIG. 16 illustrates contents of an attribute name list generated from the XML document shown in FIG. 14;

FIG. 17 illustrates contents of a text content list generated from the XML document shown in FIG. 14;

FIG. 18 illustrates contents of an attribute value list generated from the XML document shown in FIG. 14;

FIG. 19 illustrates contents of a partial structure list generated from the XML document shown in FIG. 14; and FIG. 20 is a block diagram of another modification of the computer system in this embodiment.

DESCRIPTION OF THE PREFERRED EMBODIMENTS

Preferred embodiments of the present invention are described below in detail with reference to the attached drawings.

System Structure

In one embodiment, as shown in FIG. 1, a computer system is provided with a sending computer 1 and a receiving computer 2.

Figure 10:
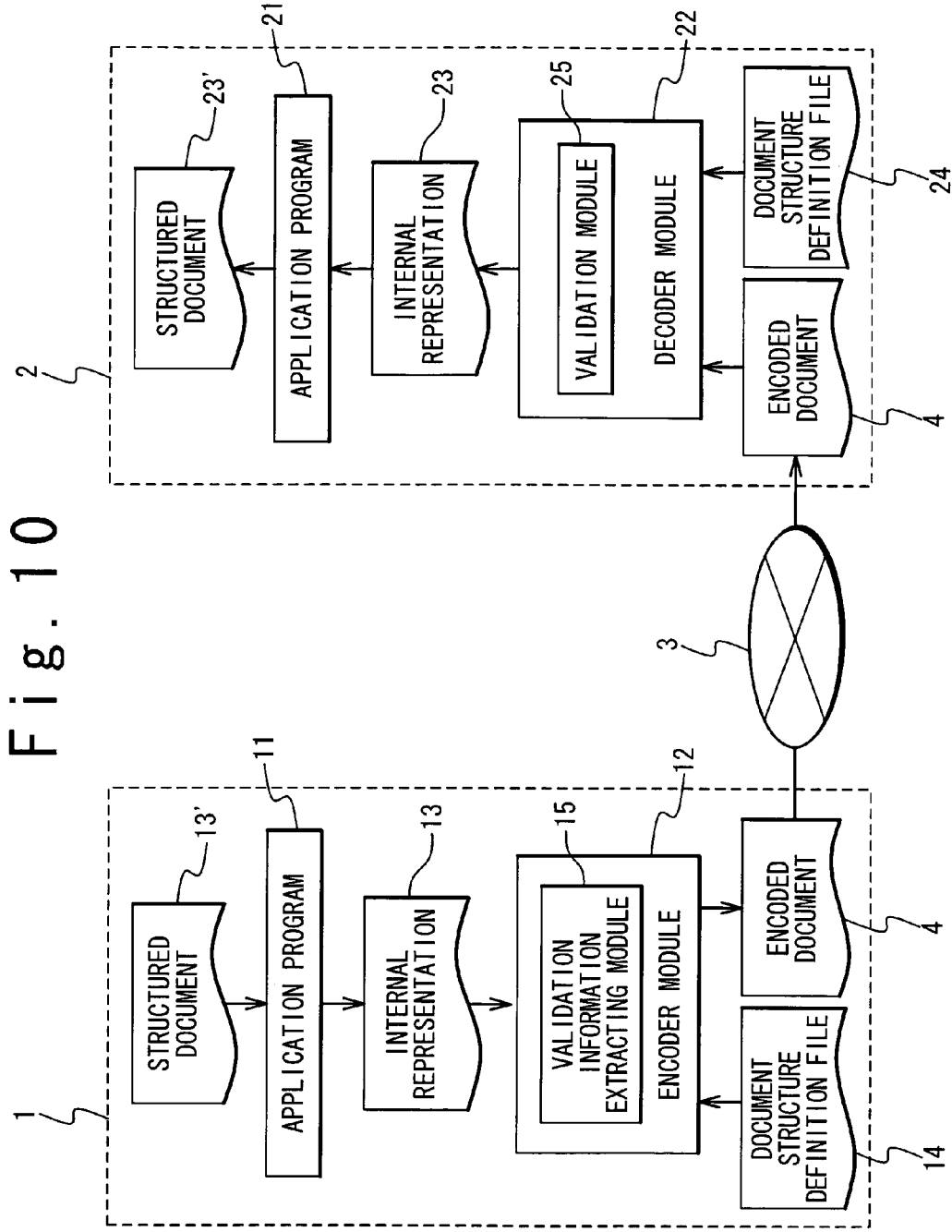
FIG. 10 is a block diagram of a modification of the computer system in this embodiment.

The sending computer 1 is installed with an application program 11 and an encoder module 12, the application program 11 supporting structured documents such as XML documents and SGML documents. The application program 11 generates an internal representation 13 of a structured document to be transmitted to the receiving computer 2. For example, as shown in FIG. 10, the application program 11 receives an externally generated structured document 13' and generates the internal representation 13 so as to correspond with the received structured document 13'.

Referring back to FIG. 1, the sending computer 1 may be provided with a document structure definition file 14 that describes a document type declaration, which is representative of the structure of structured documents the sending computer 1 is allowed to deal with. The document type declaration describes rules of the document structure. Specifically, the document type declaration includes an element type declaration defining types of elements, and an attribute type declaration defining types of attributes associated with elements.

In the case that the document structure definition file 14 is provided for the sending computer 1, the internal representation 13 is required to be in compliance with the document type declaration described in the document structure definition file 14. For an XML-supporting computer system, a DTD or XML schema may be used as document type declarations.

The encoder module 12 is a computer program that encodes the internal representation 13 received from the application program 11 to generate an encoded document 4 corresponding to the internal representation 13. The encoded document 4 is transmitted through a network 3 to the receiving computer 2.

The receiving computer 2 is installed with an application program 21 and a decoder module 22. The decoder module 22 decodes the encoded document 4 to reproduce an internal representation 23 corresponding to the internal representation 13 generated in the sending computer 1. The application program 21 receives the internal representation 23 from the decoder module 22, and performs a required process on the received internal representation 23. For example, as shown in FIG. 10, the application program 21 reproduces a structured document 23' from the internal representation 23. If the communication from the sending computer 1 to the receiving computer 2 experiences no communication error, the internal representation 23 is identical to the internal representation 13, which is generated by the application program 11 in the sending computer 1.

As shown in FIG. 1, the receiving computer 2 may store therein a document structure definition file 24 describing a document type declaration according to which the receiving computer 2 is required to deal with structured documents. As is the case of the document structure definition file 14 in the sending computer 1, the document type declaration described in the document structure definition file 24 defines rules for the structure of structured documents. Specifically, the document type declaration described in the document structure definition file 24 includes element type declarations and attribute type declarations. The document structure definition file 24 prepared in the receiving computer 2 must be document structure definition file 14 prepared in the sending computer 1.

In order for the receiving computer 2 to correctly recognize the contents of the internal representation 23, the internal representation 23 is validated to be in compliance with the document type declaration described in the document structure definition file 24. For the case that the internal representation 23 is an internal representation of an XML document, this implies to confirm that the XML document represented by the internal representation 23 is a valid XML document.

As described above, however, directly validating the internal representation 23 undesirably increases the amount of processing because of the redundancy of structured documents.

In order to reduce the amount of processing needed for validation, the encoded document 4 is generated in a special format described below and the internal representation 23 is validated on the basis of the encoded document 4. The encoded document 4 is characterized by two features as follows; firstly, the encoded document 4 includes validation information, which is used to validate the internal representation 23 by the receiving computer 2. Secondly, the encoded document 4 equivalently describes the contents of the internal representation 13 with reduced redundancy. As described above, the redundancy of structured documents undesirably increases the amount of processing needed for validation. In contrast, this embodiment achieves reduction in the amount of processing by validating the internal representation 23 using the encoded document 4.

Structure of Encoded Document

FIG. 2 shows an exemplary structure of the encoded document 4. The encoded document 4 includes an element name list 4a, an attribute name list 4b, a text content list 4c, an attribute value list 4d, a partial structure list 4e, and whole document structure data 4f.

The element name list 4a is a list in which names of the elements within the internal representation 13 are listed without duplication. FIG. 3 illustrates exemplary contents of the element name list 4a. The element name list 4a describes the element IDs and names of the elements within the internal representation 13. For example, the element identified by the element ID "E01" has an element name of "ELEMENT-NAME-A".

It should be noted that no element name is duplicated in the element name list 4a. Even if a certain element having a certain element name is repeatedly described in the internal representation 13, the element name is described in the element name list 4a only once.

The attribute name list 4b is a list in which attributes names are listed without duplication. FIG. 4 illustrates exemplary contents of the attribute name list 4b. The attribute name list 4b describes attribute IDs and attributes names of the attributes used in the internal representation 13. For example, the attribute identified an attribute ID "A01" has an attribute name of "ATTRIBUTE-NAME-A".

It should be noted that that no attribute name is duplicated in the attribute name list 4b. Even if a certain attribute having a certain attribute name is repeatedly described in the internal representation 13, the attribute name is described in the attribute name list 4b only once.

The text content list 4c is a list in which text contents of elements within the internal representation 13 are listed without duplication for the identical elements. FIG. 5 illustrates exemplary contents of the text content list 4c. The text content list 4c describes element IDs and content texts of text elements within the internal representations 13, and text IDs identifying the listed content texts. It should be noted that all the elements within the internal representations 13 are not necessarily listed in the text content list 4c because an element is allowed to be composed of only a child element(s). For example, element contents of an element identified by an element ID "E01" includes "TEXT-A" identified by a text ID "T01", "TEXT-B" identified by a text ID "T02", and "TEXT-C" identified by a text ID "T03".

No text content is duplicated for the identical elements in the text content list 4a. Even if a certain text element having certain text content is repeatedly described in the internal representation 13, the text content is described in the text content list 4c only once.

The attribute value list 4d is a list in which attributes values of the attributes used in the internal representation 13 are listed without duplication for the identical attributes. FIG. 6 illustrates exemplary contents of the attributed value list 4d. The attribute value list 4d describes attribute IDs, and attribute values of the attributes used in the internal representation 13, and text IDs identifying the listed attribute values. The text IDs listed in the text content list 4c and the attribute value list 3d are different from one another.

For example, as shown in FIG. 6, an attribute value of an attribute identified by an attribute ID "A01" is "TEXT-A" identified by a text ID "T01".

No attribute value is duplicated for the identical attributes in the attribute value list 4d. Even if a certain attribute value is repeatedly described in the internal representation 13, the attribute value is described in the attribute value list 4d only once.

The partial structure list 4e is a list in which "partial structures" exhibited in the internal representation 13 are listed without duplication. Each "partial structure" is composed of a parent element and one or more child elements thereof. It should be noted that the partial structure does not include a grandchild element of the associated parent element. A partial structure is described in the partial structure list 4e using a "partial structure representation" including:
(1) an element ID of the associated parent element;
(2) one or more attribute IDs of the attribute(s) associated with the parent element;
(3) one or more element IDs of the child element(s); and
(4) if necessary, a symbol indicating that the parent element has a text content.

FIG. 7 illustrates exemplary contents of the partial structure list 4e. The partial structure lists 4e describes structure IDs and partial structure representations of the partial structures within the internal representation 13; the structure ID's are used for identifying the partial structures. A partial structure representation includes an element ID of the associated parent element at the head thereof. For example, as shown in FIG. 7, a partial structure identified by a structure ID "S01" includes a parent element identified by an element ID "E01". The parent element has an attribute identified by an attribute ID "A01", and includes a pair of child elements identified by an element ID "E02". Additionally, a partial structure identified by a structure ID "S04" includes a parent element "E01" identified by an element ID "E01". The symbol "T" in the FIG. 7 indicates that the parent element identified by the element ID "E01" contains a text content. The partial structure representation associated with the structure ID "S04" includes no element ID with exception of that of the parent element, and this indicates that the parent element includes no child element.

No partial structure representation is duplicated in the partial structure list 4e. Even if a certain partial structure repeatedly appears in the internal representation 13, the associated partial structure representation is described in the partial structure list 4e only once.

The whole document structure data 4f indicates the whole structure of the internal representation 13. The whole document structure data 4f is described with the structure IDs and the text IDs. The whole document structure data 4f includes one or more structure IDs, each of which may be followed by the text ID of the text content or attribute value of the associated parent elements. For example, let us assume that a partial structure representation associated with an structure ID "S04" is "E04 T", the element identified by the element ID "E04" having an element name of "D", and the element identified by the text ID "T04" having a text content of "TEXT-D". When including a description "S04 T04", the whole document structure data 4f indicates that the element of the element name "D" has a text content of "TEXT-D". The whole document structure data 4f, which is described with structure IDs and text IDs, represents the whole structure of the internal representation 13 with reduced amount of data.

The aforementioned lists 4a through 4e and the whole document structure data 4f provides complete set of information needed to reproduce the internal representation 23 through decoding the encoded document 4.

The lists 4a through 4e are used not only as information used for reproducing the internal representation 23 but also as information used for validating the internal representation 23. The element name list 4a and the text content list 4c are used for validating whether the text contents of the elements within the internal representation 23 are in compliance with the element types declared in the document structure definition file 24. The attribute name list 4b and the attribute value list 4d are used for validating whether the attribute values described in the internal representation 23 are in compliance with the attribute types declared in the document structure definition file 24. The partial structure list 4e is used for validating whether the partial structures exhibited in the internal representation 23 are in compliance with the document structure defined in the document structure definition file 24. The use of these lists 4a through 4e enables the validation of the internal representation 23 before reproducing the internal representation 23 through decoding the encoded document 4.

Excluding duplication from the text content list 4c, the attribute value 4d, and the partial structure list 4e effectively reduces the amount of processing needed to validate the internal representation 23. Listing the text contents without duplication in the text content list 4c eliminates a need for repeatedly validating the same text content. Correspondingly, listing the attribute values without duplication in the attribute value list 4d eliminates a need for repeatedly validating the same attribute value. Additionally, listing the partial structures without duplication in the partial structure list 4e eliminates a need for repeatedly validating the same partial structure.

Structure of Encoder and Decoder modules

Figure 8:
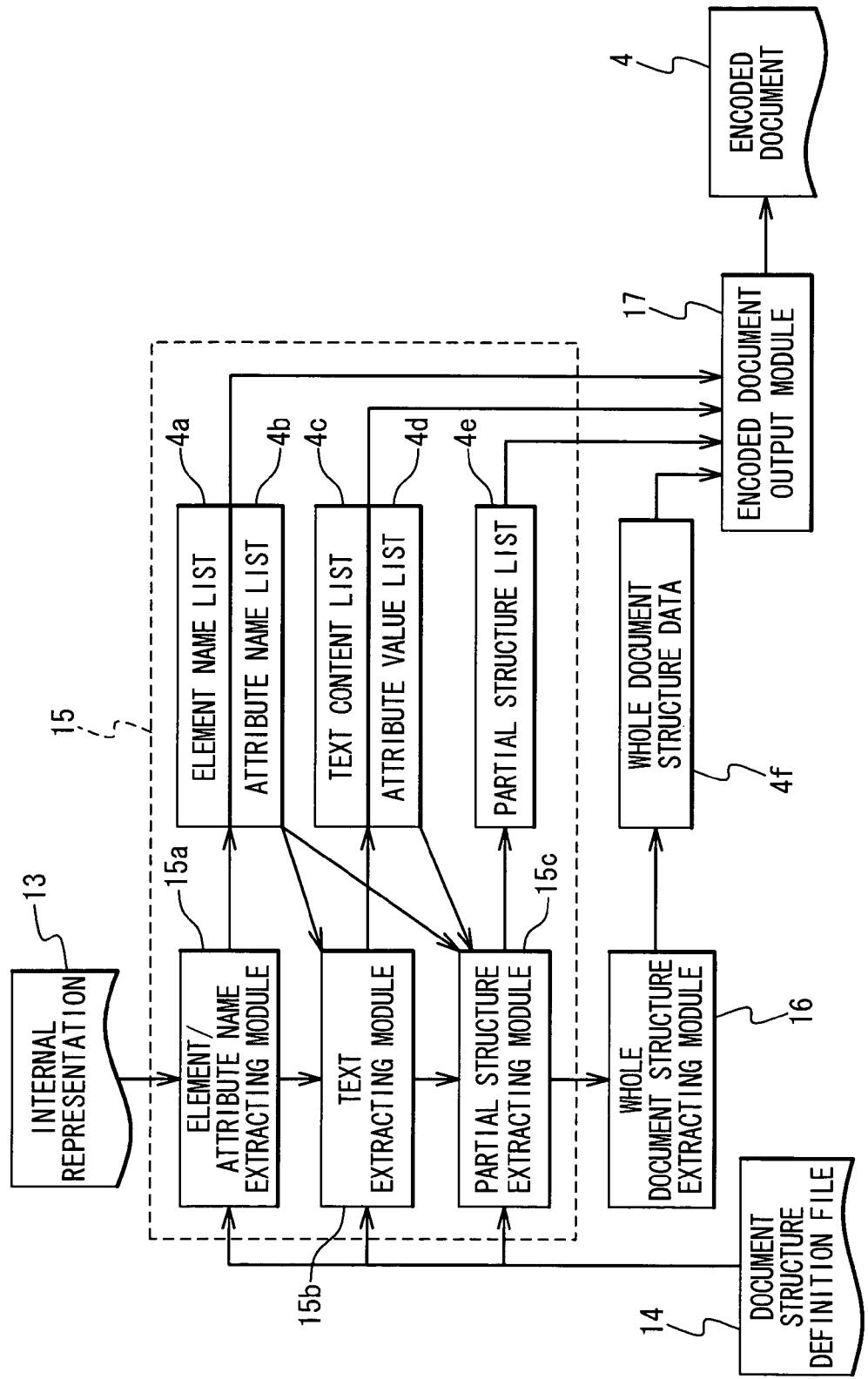
FIG. 8 is a block diagram of an encoder module.

FIG. 8 illustrates an exemplary structure of the encoder module 12, which generates the encoded document 4 in the sending computer 1. The encoder module 12 is composed of a validation information extracting module 15, a whole document structure extracting module 16, and an encoded document output module 17.

The information extracting module 15 includes an element/attribute name extracting module 15a, a text extracting module 15b, and a partial structure extracting module 15c. The element/attribute name extracting module 15a extracts the element names and attribute names from the internal representation 13 to generate the element name list 4a and the attribute name list 4b. The text extracting module 15b extracts the text contents and attribute values from the internal representation 13 to generate the text content list 4c and the attribute value list 4d using the element name list 4a and the attribute name list 4b, which are generated by the element/attribute name extracting module 15a. The partial structure extracting module 15c extracts partial structures from the internal representation 13 to generate the partial structure list 4e. Specifically, the partial structure extracting module 15c defines a structure ID for each extracted partial structure, and lists the structure IDs of the extracted partial structures and the partial structure representations thereof in the partial structure list 4e.

In the case that the sending computer 1 includes the document structure definition file 14, the element/attribute name extracting module 15a, the text extracting module 15b, and the partial structure extracting module 15c preferably uses the document structure definition file 14 to efficiently generate the element name list 4a, the attribute name list 4b, the text content list 4c, the attribute value list 4d, The whole document structure extracting module 16 generates the whole document structure data 4f from the internal representation 13. Specifically, the whole document structure extracting module 16 recognizes the whole structure of the associated structured document on the basis of the internal representation 13, and generates the whole document structure data 4f to indicate the whole structure with the structure IDs and the text IDs.

The encoded document output module 17 develops the encoded document 4 through synthesizing the whole document structure data 4f and the aforementioned lists, including the element name list 4a, the attribute name list 4b, the text content list 4c, the attribute value list 4d, and the partial structure list 4e.

Figure 9:
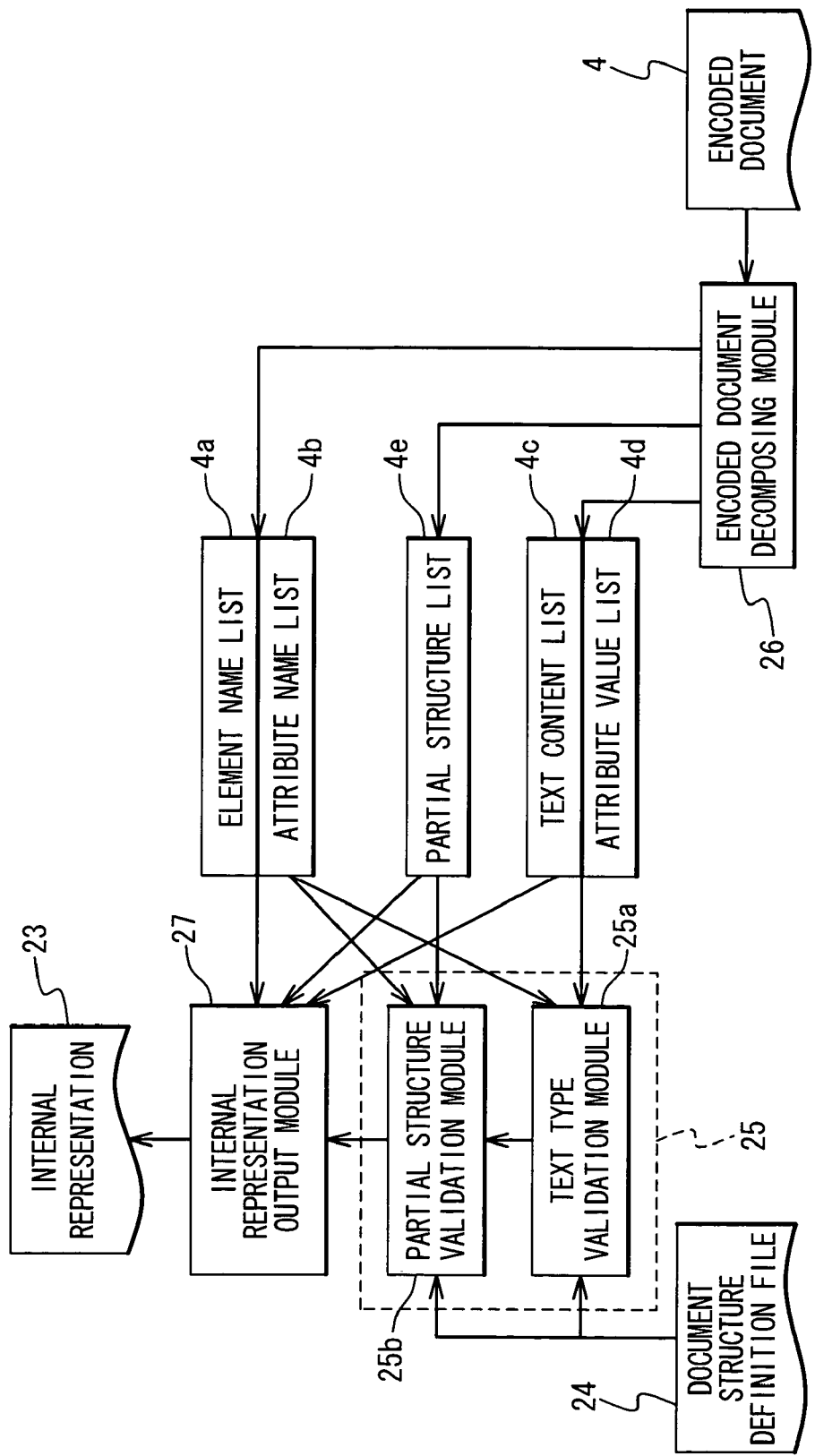
FIG. 9 is a block diagram of a decoder module.

FIG. 9 illustrates an exemplary structure of the decoder module 22, which decodes the encoded document 4 to reproduce the internal representation 23. The decoder module 22 is composed of a validation module 25, an encoded document decomposing module 26, and an internal representation output module 27.

The encoded document decomposing module 26 decomposes the encoded document 4 to reproduce the element name list 4a, the attribute name list 4b, the text content list 4c, the attribute value list 4d, the partial structure list 4e, and the whole document structure data 4f.

The validation module 25 is composed of a text type validation module 25a and a partial structure validation module 25b. The text type validation module 25a validates whether the text contents and the attribute values are in compliance with the document type declaration described in the document structure definition file 24. The partial structure validation module 25b validates whether the partial structures listed in the partial structure list 4e are in compliance with the types defined in the document structure definition file 24.

The internal representation output module reproduces the element name list 4a, the attribute name list 4b, the text content list 4c, the attribute value list 4d, the partial structure list 4e, and the whole document structure data 4f.

Computer System Operation

Figure 11:
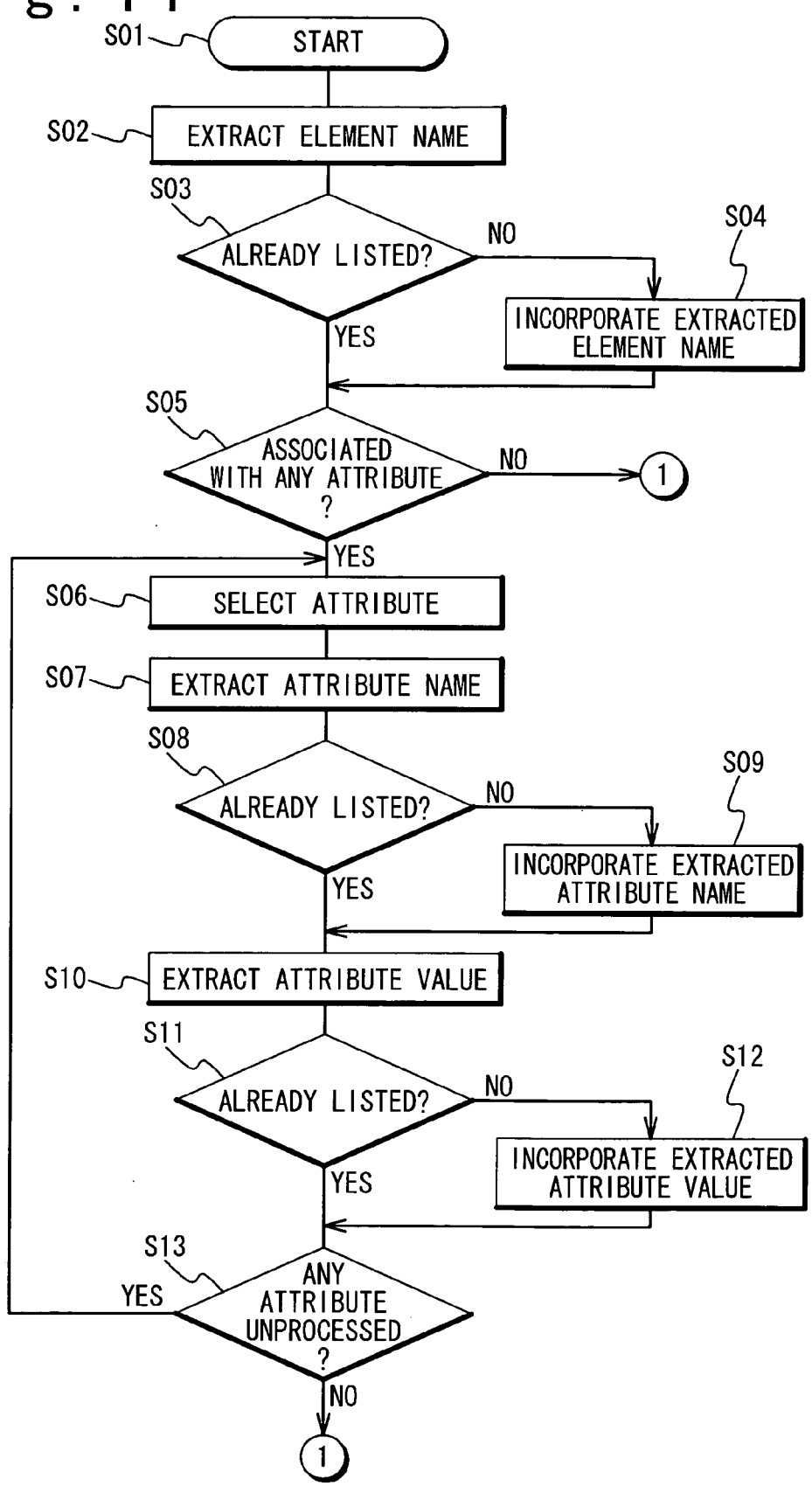
FIGS. 11 and 12 are a flowchart illustrating a procedure for generating the encoded document.
Figure 12:
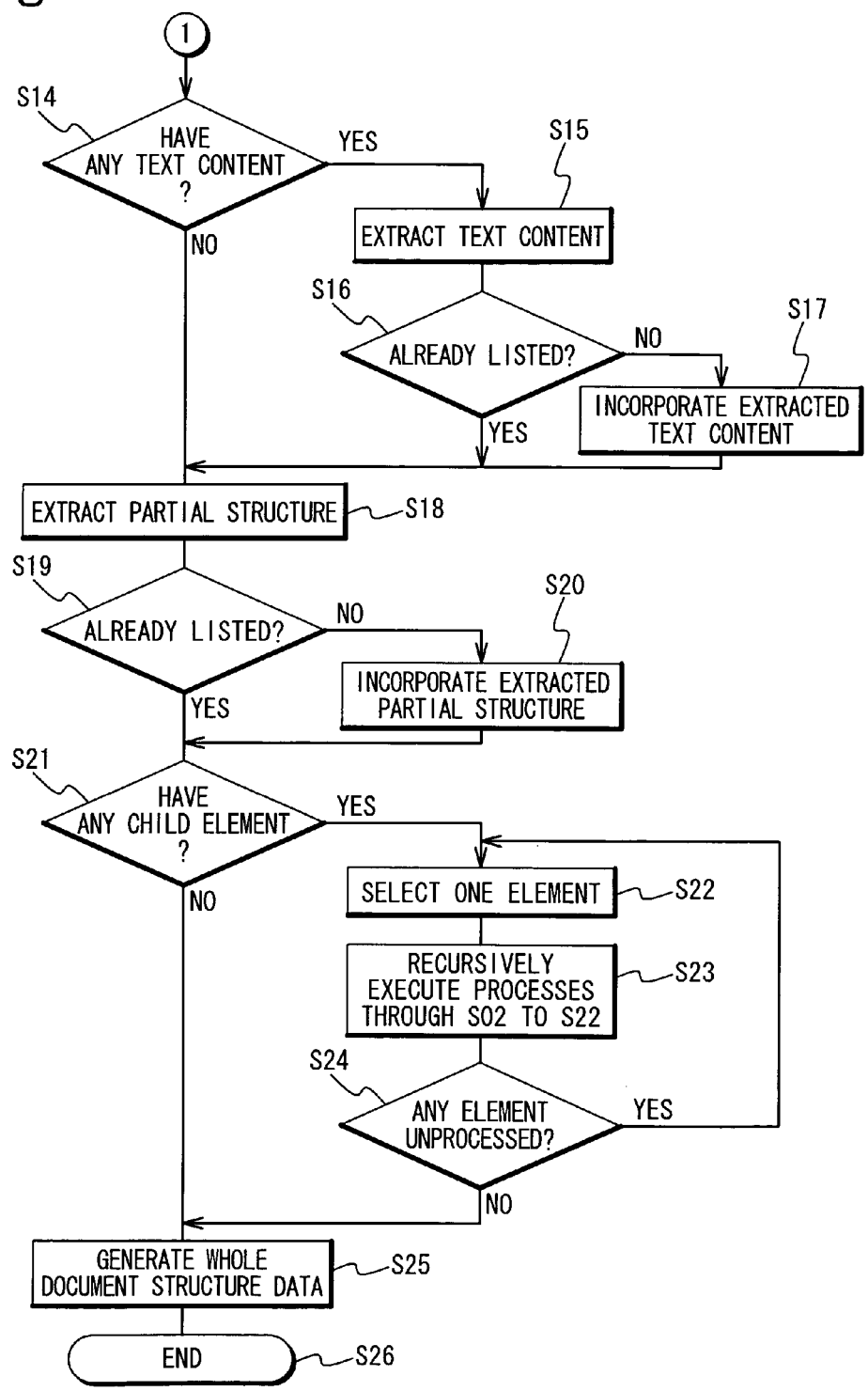

FIGS. 11 and 12 illustrate a flowchart of the procedure for the encoder module 12 to encode the internal representation 13 of the target structured document to develop the encoded document 4. At Step S01, on receiving the internal representation 13, the encoder module 12 develops an element name list 4a, an attribute list 4b, a text content list 4c, an attribute value list 4d, and a partial structure list 4e. All of these lists initially have no content. The encoder module 12 then selects an element to be processed by the element/attribute name extracting module 15a out of the elements described within the internal representation 13. The element selected to be processed is referred to as the target element, hereinafter. The root element of the structured document is initially selected as the target element.

The element/attribute name extracting module 15a extracts the element name of the target element at Step S02, and then determines whether the element name of the target element is listed in the element name list 4a at Step S03. When the extracted element name is not listed, the element/attribute name extracting module 15a defines an element ID for the target element and incorporates the element name and the element ID into the element name list 4a at Step S04. The processes executed at Steps S03, and S04 effectively eliminate duplication of element names in the element name list 4a.

The element/attribute name extracting module 15a then determines whether the target element is associated with any attribute at Step S05. When the target element is associated with no attribute, the procedure jumps to Step S14 as shown in FIG. 12.

When the target element is associated with one or more attributes, the element/attribute name extracting module 15a selects one of the attributes at Step S06. It should be understood that, when the target element is associated with only a single attribute, the single attribute is unconditionally selected.

The element/attribute name extracting module 15a then extracts the attribute name of the selected attribute from the internal representation 13 at Step S07, and determines whether the extracted attribute name is listed in the attribute name list 4b at Step S08. If not so, the element/attribute name extracting module 15 defines an attribute ID for the selected attribute, and incorporates the attribute name of the selected element and the attribute ID thereof into the attribute name list 4b at Step S08. The processes executed at Step S08 and S09 effectively eliminate duplication of the attribute names in the attribute name list 4b.

The text extracting module 15b then extracts the attribute value of the selected attribute at Step S10, and determines whether the extracted attribute value is listed in the attribute value list 4d at Step S11. If not so, the text extracting module 15b defines a text ID for the attribute value, and incorporates the attribute value of the selected attribute and the text ID thereof into the attribute value list 4d at Step S12. The processes executed at Step S11 and S12 effectively eliminate duplication of the attribute values in the attribute value list 4d.

The element/attribute name extracting module 15a then determines at Step S13 whether the processes of Steps S07 though S12, which is referred to as an attribute listing process hereinafter, are executed for all the attributes associated with the target element. If not so, another attribute is selected and the attribute listing process is executed for the selected attribute.

After all the attributes associated with the target element go through the attribute listing process, as illustrated in FIG. 12, the text extracting module 15b then determines whether the target element has a text content at Step S14. If not so, the procedure is jumped to the Step S18. When the target element has a text content, the text extracting module 15b extracts the text content at Step S15, and determines whether the extracted text content is listed in the text content list 4c at Step S16. If not so, the text extracting module 15b defines a text ID for the extracted text content, and incorporates the text content and the defined text ID into the text content list 4c at Step S17. The processes executed at Step S16 and S17 eliminates duplication of the text content in the text content list 4c.

This is followed by partial structure extraction at Step S18. The partial structure extracting module 15c extracts a partial structure having the target element as the parent element thereof from the internal representation 13, and obtains the partial structure representation of the extracted partial structure at Step S18. As described above, the partial representations are described with element IDs and/or attribute IDs. The element IDs used for generating the partial structure list 4e are obtained by a lookup on the element name list 4a with the associated element names as queries. Correspondingly, the attribute IDs are obtained by a lookup on the attributes name list 4b with the associated attribute names used as queries.

Additionally, the partial structure extracting module 15c determines whether the extracted partial structure is listed in the partial structure list 4e at Step S19. If not so, the partial structure extracting module 15c defines a structure ID for the extracted partial structure, and incorporates the partial structure representation of the partial structure and the structure ID thereof into the partial structure list 4e.

The encoder module 12 then determines whether the target element includes any child element at Step S21. If so, the encoder module 12 then selects one child element as the next target element at Step S22. If the target element includes only a single child element, the child element is unconditionally selected as the next target element. If the target element includes a plurality of child elements, the encoder module 12 then selects one of the child elements as the next target element. Then, the encoder module 12 recursively executes the process of Steps S02 through S22 for the next target element. This results in that the element name and the element ID of the selected child element are incorporated into the element name list 4a, the attribute name(s) and attribute ID(s) of the attribute(s) associated with the child element are incorporated into the attribute name list 4b, the text content of the child element is incorporated into the text content list 4c, and the partial structure having the selected child element as the parent element is listed in the partial structure list 4d. The same goes for the case when the selected child element further has any child element.

After the processes of Step S02 through Step S23 are completed for all the elements, the recursive processes are halted at Step S24, and the whole document structure extracting module 16 generates the whole document structure data 4f at Step S25, which indicates the structure of the internal representations 13 with the structure IDs and the text IDs.

The encoded document output module 17 then synthesizes the element name list 4a, the attribute name list 4b, the text content list 4c, the attribute value list 4d, the partial structure list 4e, and the whole document structure data 4f to finally generate the encoded document at Step S26.

Figure 13:
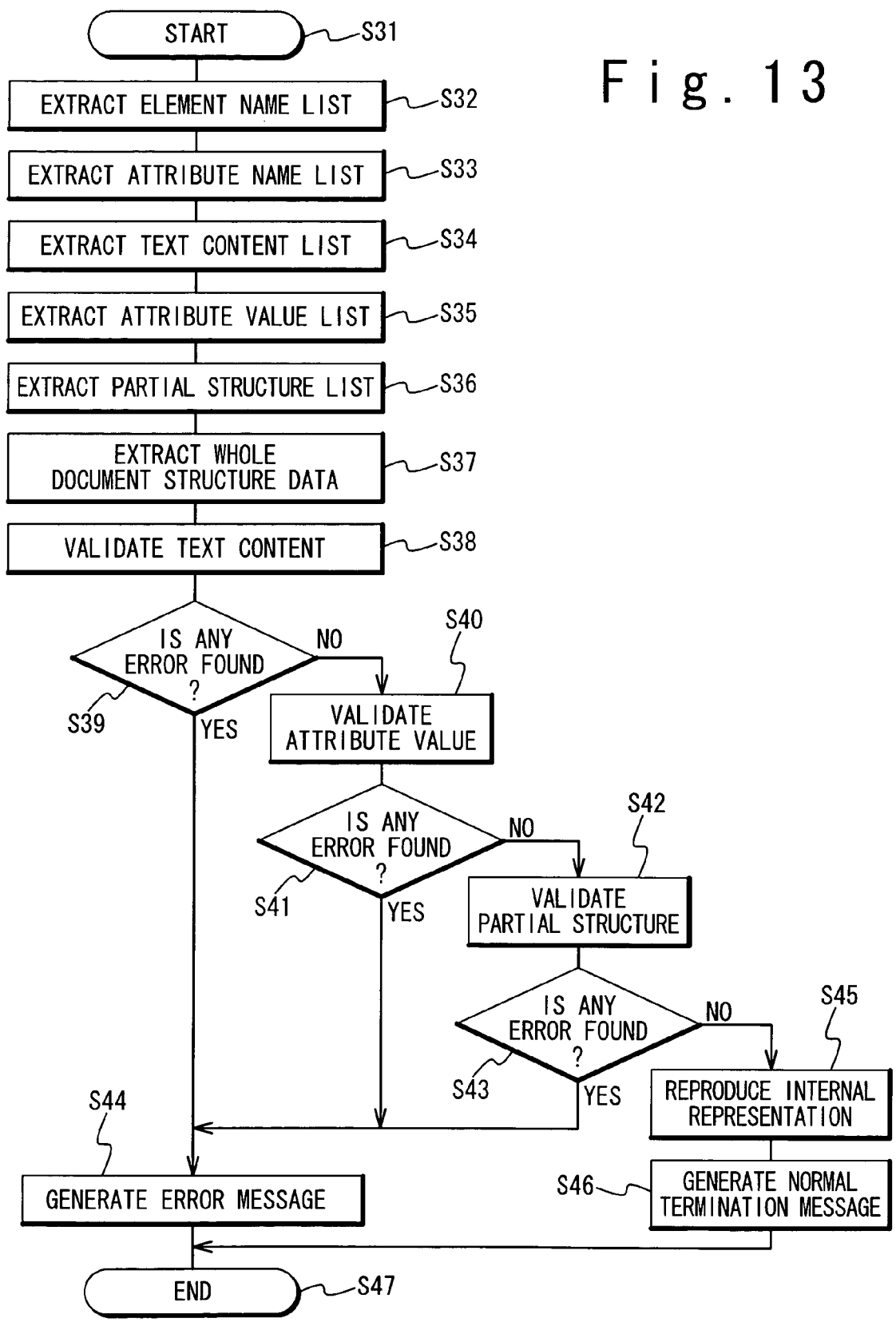
FIG. 13 is a flowchart illustrating a procedure for validating and reproducing an internal representation to be received by a receiving computer.

FIG. 13 illustrates a flowchart of the procedure for the decoder module 22 to validate and reproduce the internal representation 23 from the encoded document 4. On receiving the encoded document 4, the encoded document decomposing module 26 within the decoder module 22 decomposes the encoded document 4 to reproduce the element name list 4a, the attribute name list 4b, the text content list 4c, the attribute value list 4d, the partial structure list 4e, and the whole document structure data 4f at Steps S32 through S37.

The text type validation module 25a within the decoder module 22 validates the text contents listed in the text content list 4c at Step S38. The validation of the text contents is achieved through the following steps; the text type validation module 25a obtains the element names of the elements associated with the listed text contents. The text type validation module 25a then obtains the element type declarations defined for the associated elements from the document structure definition file 24 using the element names used as queries. This is followed by determining whether the text contents are in compliance with the types defined in the element type declarations at Step S39. If not so, that is, any element type error is found, and the text type validation module 25a develops an element type error message indicating the occurrence of the element type error. The element type error message is displayed on the display screen of the receiving computer 2, and also transmitted to the sending computer 2 to be displayed on the display screen of the sending computer 1 at Step S44. When any element type error is found, the procedure is cancelled at Step S47, and the internal representation 23 is not reproduced.

When no element type error is found, the text type validation module 25a validates the attribute values listed in the attribute value list 4d at Step S40. The validation of the attribute values is achieved by the following procedure; the text type validation module 25a obtains the attribute names of the attributes associated with the attribute values listed in the attribute value list 4d from the attribute name list 4b using the attribute IDs as queries. The text type validation module 25a then obtains the attribute type declarations of the associated attributes through a lookup on the document structure definition file 24 with the obtained attribute names used as queries. This is followed by determining whether the attribute values are in compliance with the type defined in the attribute type declarations at Step S41. If not so, that is, any attribute type error is found, and the text type validation module 25a generates an attribute type error message indicating the occurrence of the attribute type error. The attribute type error message is displayed on the display screen of the receiving computer 2, and also transmitted to the sending computer 2 to be displayed on the display screen of the sending computer 1 at Step S44. When any attribute type error is found, the procedure is cancelled at Step S47, and the internal representation 23 is not reproduced.

When no attribute type error is found, the partial structure validation module 25b validates the partial structures listed in the partial structure list 4e at Step S42. The validation of the partial structures is achieved through the following procedure; the partial structure validation module 25b performs a lookup on the element name list 4a using the element IDs described in the partial structure representations listed in the partial structure list 4e as queries to obtains the element names of the element associated with the respective partial structures. The partial structure validation module 25b then determines the element names of the parent elements associated with the respective partial structures. The partial structure validation module 25b then performs a lookup on the document structure definition file 24 using the element names of the parent elements as queries to obtain the types which the respective partial structures are to be in compliance with. The partial structure validation module 25b then determines whether the partial structures are respectively in compliance with the types defined in the document structure definition file 24 at Step S43. If not so, that is, any partial structure type error is found, and the partial structure validation module 25b develops a partial structure type error message indicating the occurrence of the partial structure type error. The partial structure type error message is displayed on the display screen of the receiving computer 2, and also transmitted to the sending computer 2 to be displayed on the display screen of the sending computer 1 at Step S44. When any partial structure type error is found, the procedure is cancelled at Step S47, and the internal representation 23 is not reproduced.

When none of the element type error, the attribute type error, and the partial structure error is found, the internal representation output module 27 reproduces the internal representation 23 from the element name list 4a, the attribute name list 4b, the text content list 4c, the attribute value list 4d, the partial structure list 4e, and the whole document structure data 4f. Specifically, the internal representation output module 27 analyzes the whole document structure data 4f with reference with the element name list 4a, the attribute name list 4b, the text content list 4c, the attribute value list 4d, and the partial structure list 4e. The analysis provides the internal representation output module 27 with necessary information for reproducing the internal representation 23, including the element names of the elements to be described in the internal representation 23, the contents of the associated elements (that is, the text contents and the element names of the child elements thereof), the attribute names of the attributes associated with each of the elements, the attribute values of the associated attributes. The internal representation output module 27 the reproduces the internal representation 23 using this information.

The internal representation output module 27 then issues a normal termination message informing that no type error is found. The normal termination message is displayed on the display screen of the receiving computer 2, and also transmitted to the sending computer 2 to be displayed on the display screen of the sending computer 1 at Step S46. The procedure is then completed at Step S47.

As thus described, the decoder module 24 validates the internal representation 23 on the basis of the text content list 4c, the attribute value list 4d, and the partial structure list 4e before the internal representation 23 is reproduced. This validation method effectively reduces the amount of processing for validation of the internal representation 23 because of the reduced redundancy of these lists. The text content list 4c, the attribute value list 4d, and the partial structure list 4e are free from duplication, and this effectively eliminates the need for repeatedly validating the same text contents, the same attribute values, and the same partial structures. Accordingly, the amount of processing for the validation of the internal representation 23 is effectively reduced.

OPERATION EXAMPLE

In this example, an XML document illustrated in FIG. 14 is encoded, validated, and then decoded through the procedure described above.

The procedure begins with generating the internal representation 13 so as to correspond with the XML document by the application program 11. The internal representation 13 is provided with the encoder module 12.

At step S01, the element name list 4a, the attribute name list 4b, the text content list 4c, the attribute value list 4d, and the partial structure list 4e are initialized. This is followed by selecting a rout element whose name is "AddressBook" as the target element.

The element name "AddressBook" of the rout element is extracted at Step S02. Since this element name is not listed in the element name list 4a, as shown in FIG. 15, an element ID "E01" define for the element and the element name "AddressBook" are incorporated into the element name list 4a at Step S04.

This is followed by determining whether the target element (that is, the root element) is associated with any attribute at Step S05. Since the root element is associated with an attribute whose name is "owner" as shown in FIG. 14, the attribute is selected at Step S06, and the attribute name "owner" is extracted at Step S07. Since the attribute name "owner" is not listed in the attribute name list 4b, an attribute ID "A01" defined for the attribute and the attribute name "owner" are incorporated into the attribute name list 4b at Steps S08, and S09 (See FIG. 16).

An attribute value "Suzuki" of the attribute is then extracted at Step S10. Since the attribute value "Suzuki" is not listed in the attribute value list 4d, the attribute ID "A01" of the selected attribute "owner", a text ID "T10" defined for the attribute value, and the attribute value "Suzuki" are incorporated into the attribute value list 4d at Steps S11 and S12. Since the root element does not have any other element, the attribute listing process is completed.

This is followed by determining whether the target element (that is, the root element) has a text content at Step S14. Because the root element has no text content, the procedure jumps to Step S18.

At Step S18, the partial structure whose parent element is the root element "AddressBook" is extracted. In other words, the attribute and the child element(s) of the root element are extracted. The partial structure representation of the extracted partial structure is described with the element ID of the parent element (that is, the root element), the attribute ID of the attribute associated with the parent element, and the element ID(s) of the child element(s). For the case that the element ID of the child element of the root element is "E02", the partial structure representation is exemplarily determined to be "E01 A01 E02 E02". In this example, a partial structure representation is described in accordance with a rule that an element ID of the associated parent element, an attribute ID of an attribute(s) associated with the parent element, and an element ID(s) of the child element(s) are listed in this order. It should be understood that, when the parent element is associated with a plurality of attributes, the attribute IDs associated therewith are sequentially listed. It should be also appreciated that, when the parent element has a plurality of child elements, the element IDs associated therewith are sequentially listed.

This is followed by determining whether the extracted partial structure is listed in the partial structure list 4e at Step S19. Since the extracted partial structure, which includes the element "AddressBook" as the parent element, is not listed, a structure ID "S01" is defined for the extracted partial structure, and the defined structure ID and partial structure representation "E01 A01 E02 E02" of the extracted partial structure is incorporated into the partial structure list 4e.

At Step S21, it is determined whether the root element "AddressBook" has any child element. Since the root element has a pair of child elements "Person" as shown in FIG. 14, the child elements "Person" is successively selected as the target element, and the processes of Step S02 through S22 are recursively executed at Step S22 to S24.

This completes the element name list 4a, the attribute name list 4b, the text content list 4c, the attribute value list 4d, and the partial structure list 4e. FIGS. 15 through 18 respectively illustrate the resultant element name list 4a, the attribute name list 4b, the text content list 4c, the attribute value list 4d, and the partial structure list 4e.

The whole document structure data 4f is then generated. The whole structure of the XML document of FIG. 14 is exemplarily described to read "S01 T10 S02 S03 S04 T01 S05 T02 S06 S07 T04 S08 T05 S09 T06 S10 T08 S11 S03 S04 T01 S05 T03 S12 S07 T04 S08 T05 S09 T07 S13 T09" with structure IDs listed in the partial structure list 4e shown in FIG. 19, and the text IDs listed in the text content list 4c and the attribute value list 4d shown in FIGS. 17 and 18. In this example, the whole document structure data 4f is generated in accordance with the following rule; the structure ID of the partial structure whose parent element is the top-level element of the structured document is listed on the head of the whole document structure data 4f. The structure ID is followed by the text IDs of the attribute value of the attribute and the text content of the parent element. The text IDs are followed by the structure ID of the partial structure whose parent element is the child element of the top-level element. The same recursively goes for the remaining elements; the text IDs of the attribute values and the text content associated with the child element are listed in the whole document structure data 4f and the text IDs are followed by the structure ID whose parent element is the grandchild element of the top-level element.

When having parentheses inserted for helping the understanding thereof, the whole document structure data 4f is re-described to read "S01 T10 (S02 (S03 (S04 T01) (S05 T02) (S06 (S07 T04) (S08 T05) (S09 T06)) (S10 T08)) (S11 (S03 (S04 T01) (S05 T03) (S12 (S07 T04) (S08 T05) (S09 T07) (S13 T09))))".

The structure ID "S01" indicates that the parent element of the partial structure identified by the structure ID "S01" is the root element of the structured document. The partial structure representation "E01 A01 E02 E02" indicates that the element identified by the element ID "E01", that is, the element "AddressBook" is the root element (See FIG. 15). Therefore, the element name of the root element is determined to be "AddressBook" from the element name list 4a shown in FIG. 15.

Additionally, the partial structure representation "E01 A01 E02 E02" indicates that the root element is associated with the attribute identified by the attribute ID "A01", that is, the attribute "owner" (see FIG. 16), and a pair of elements identified by the element ID "E02", that is, the elements "Persons" (see FIG. 15). The text ID "T10" following the structure ID "S01" within the whole document structure data 4f indicates that the attribute value of the attribute associated with the root element is "Suzuki" which is identified by the text ID "T10" (see FIG. 18).

The former one of the elements "Person" is associated with the representation "(S02 (S03 (S04 . . . )))", while the latter one of the elements "Person" is associated with the representation "(S11 (S03 (S04 . . . )))". The partial structure representation of the partial structure identified by the structure ID "S02" is "E02 E03 E06 E10" (see FIG. 19), and this indicates that the former one of the elements "Person" includes three elements identified by the element IDs "E03", "E06", and "E10" as the child elements. The element identified by the element ID "E03" is associated with the representation "(S03 (S04 T01) (S05 T02))", the element identified by the element ID "E06" is associated with the representation "(S06 (S07 T04) (S08 T05) (S09 T06))", and the element identified by the element ID "E10" is associated with the representation "(S10 T08)". The same goes for the remainder of the XML document of FIG. 14. It should be noted that another rule may be used to represent the whole structure of the structured document.

After the whole document structure data 4f is generated, the encoded document 4 is developed through synthesizing the element name list 4a, the attribute name list 4b, the text content list 4c, the attribute value list 4d, the partial structure list 4e, and the whole document structure data 4f.

When the encoded document 4 corresponding to the XML document of FIG. 14 is provided with the decoder module 22, the encoded document 4 is decomposed to reproduce the element name list 4a, the attribute name list 4b, the text content list 4c, the attribute value list 4d, the partial structure list 4e, and the whole document structure data 4f at Steps S32 through S37.

At Step S38, the text contents listed in the text content list 4c are then validated by the text type validation module 25a. For each of the nine text contents listed in the text content list 4c, the element ID of the associated element is obtained, and a lookup on the element name list 4a is performed with the obtained elements ID used as queries to obtain the element names of the associated elements. The obtained element names are used as queries in performing a lookup on the document structure definition file 24 to obtain the associated element type declarations. The listed text contents are then validated to determine whether they are in compliance with the element type declarations.

Referring to FIG. 15, for example, let us consider a case when the element type declaration declares that the text content of the element "LastName" must be text. As shown in FIG. 17, the element "LastName" has the text content "Yamada", and thus the element "LastName" is determined to be valid.

In another example, let us consider another case when the element type declaration declares that the text content of the element "Telephone" is requested to consists of three hyphened natural numbers, the first and second numbers being three-digit numbers, the last number being four-digit number. As shown in FIG. 17, the element "Telephone" has a text content "045-123-4567", and thus the text content of the element "Telephone" is determined to be valid.

The text content may be an integer, a floating-point number, or a date type text.

When no element type error is found, the attribute values listed in the attribute value list 4d are validated at Step S40. The attribute ID associated with the attribute value listed in the attribute value list 4d is obtained and the attribute name identified by the attribute ID is obtained through a lookup on the attribute name list 4b with the attribute ID used as a query.

The attribute type declaration associated with the attribute is then extracted from the document structure definition file 24 through a lookup thereon with the obtained attribute name. This followed by determining whether the attribute value is in compliance with the attribute type declaration.

Referring to FIG. 16, for example, let us consider a case when the associated attribute type declaration declares that the attribute value of the attribute "owner" must be text. As shown in FIG. 18, the attribute value of the attribute "owner" is "Suzuki", and thus the attribute value is determined to be valid.

This is followed by validating thirteen partial structures listed in the partial structure list 4e at Step S42. As shown in FIG. 19, for example, the partial structure identified by the structure ID "S01" is described by the partial structure representation "E01 A01 E02 E02". Referring the element name list 4a and the attribute name list 4b indicates that the element "AddressBook" identified by the element ID "E01" has the attribute "owner" and also has a pair of elements "Person". Such partial structure is validated whether it is in compliance with the syntax described in the document structure definition file 24. The same goes for the remaining partial structures, and the validation of the partial structures is completed.

After the validation of the listed text contents, attribute value, and partial structures, the internal representation 23 corresponding the XML document shown in FIG. 14 is reproduced from the element name list 4a, the attribute name list 4b, the text content list 4c, the attribute value list 4d, the partial structure list 4e and the whole document structure data 4f.

The validation method thus described effectively avoids duplicated validation of the same text contents, attribute values, and partial structures. If the XML document shown in FIG. 14 is directly validated, duplicated validation is inevitable; for example, the XML document describes twice that an element "Person" includes elements "Name" and "Address" and the element "Name" includes elements "LastName" and "FirstName". Therefore, direct validation of the XML document requires unnecessarily validating this description twice. Furthermore, direct validation of the XML document requires unnecessarily determining twice whether the text content "Yamada" of the element "LastName" is valid. The same goes for the text content "Japan" of the element "Country", and the text content "Kanagawa" of the element "Prefecture".

In contrast, the computer system in this embodiment generates the encoded document 4 for reducing unnecessary redundancy, and confirms the validity of the internal representation 23 using the encoded document 4 before reproducing the internal representation 23. This effectively eliminates duplicated validation, and thereby reduces the cost of validation of the structured document.

In an alternative embodiment, as shown in FIG. 20, it is advantageous if the sending computer 1 includes a data compressing module 18 and the receiving computer 2 includes a data decompressing module 28. The data compressing module 18 is used for compressing the encoded document 4 to generate the compressed encoded document 4'. The data decompressing module 18 is used for decompressing the compressed encoded document 4' to reproduce the encoded document 4. This architecture effectively reduces the amount of data transmitted from the sending computer 1 to the receiving computer 2.

In another alternative embodiment, the element name list 4a does not describe the element IDs explicitly when the element IDs includes serial numbers; instead, the listing order of the element names may be used to identify the element names. For instance, the element name listed on the top of the element name list 4a may be defined as being identified by the element ID "E01", and the element ID "E01" may fail to be described explicitly in the element name list 4a. Excluding the element IDs from the element name list 4a effectively reduces the size of the encoded document 4, and is therefore effective especially for the case when the communication cost is of much importance.

The same goes for the attribute IDs described in the attribute name list 4b, and the structure IDs described in the partial structure list 4e.

Correspondingly, in still another embodiment, the text IDs may fail to be described explicitly in the case when the text content list 4c and the attribute value list 4d are incorporated into a list, and the text IDs includes serial numbers.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

What is claimed is:

1. A computer system comprising:
   a sending computer including an encoder module encoding an internal representation of a structured document to generate an encoded document; and
   a receiving computer including a decoder module which receives said encoded document through a network, and decodes said encoded document to reproduce said internal representation,
   wherein said encoder module lists texts and structures included within said structured document without duplication to thereby generate validation information, and incorporates said validation information into said encoded document;
   wherein said decoder module includes a validation module which is responsive to said validation information to validate whether a data structure of said reproduced internal representation is in compliance with a predetermined document type declaration, said validation information including:
a partial structure list which lists partial structures within said internal representation without duplication,
an element name list which lists element names of elements described in said internal representation,
an attribute name list which lists attribute names of attributes used in said internal representation,
a text content list which lists text contents of text-including elements out of said elements described in said internal representation without duplication, and
an attribute value list which lists attribute values of said attributes used in said internal representation;
wherein said validation module validates whether said partial structures are in compliance with a syntax defined in said document type declaration,
wherein said partial structures are respectively associated with structure IDs,
wherein said text contents and said attribute values are respectively associated with text IDs in said text content list and said attribute value list,
wherein each of said partial structures is described in said partial structure list using an element ID of an associated parent element described in said internal representation, an attribute ID of an attribute associated with said parent element, an element ID of a child element of said parent element, and a symbol which represents that said parent element have a text content,
wherein said encoded document includes a whole structure data describing a whole structure of said internal representation using said structure IDs, and said text IDs, and
wherein said decoder module reproduces said internal representation using said element name list, said attribute name list, and said whole structure data.

2. The computer system according to claim 1, wherein said validation information includes a text content list which lists text contents of text-including elements described in said internal representation without duplication,
wherein said document type declaration includes an element type declaration which defines types of said text-including elements, and
wherein said validation module validates whether said text-including elements are in compliance with said defined types.

3. The computer system according to claim 1, wherein said validation information includes an attribute value list which lists attribute values of attributes associated with elements described in said internal representation without duplication,
wherein said document type declaration includes an attribute type declaration which defines attribute types of said attributes, and
wherein said validation module validates whether said elements having said attributes are in compliance with said defined attribute types.

4. The computer system of claim 1, wherein said validation module validates said internal representation on a basis of said text content list, said attribute value list, and said partial structure list, before said internal representation is reproduced.

5. The computer system of claim 4, wherein if said validation module detects an error, an error message is generated and said internal representation is not reproduced.

6. A method for transmitting a structured document, comprising:
encoding an internal representation of said structured document to generate an encoded document;
receiving said encoded document through a network; and
decoding said encoded document to reproduce said internal representation,
wherein said encoding includes:
listing texts and structures of said structured document without duplication to generate validation information; and
incorporating said validation information into said encoded document, and
wherein said decoding includes:
validating based on said validation information whether said internal representation to be reproduced is in compliance with a predetermined document type declaration, said validation information including:
a partial structure list which lists partial structures within said internal representation without duplication,
an element name list which lists element names of elements described in said internal representation,
an attribute name list which lists attribute names of attributes used in said internal representation,
a text content list which lists text contents of text-including elements out of said elements described in said internal representation without duplication, and
an attribute value list which lists attribute values of said attributes used in said internal representation;
wherein said validating validates whether said partial structures are in compliance with a syntax defined in said document type declaration,
wherein said partial structures are respectively associated with structure IDs,
wherein said text contents and said attribute values are respectively associated with text IDs in said text content list and said attribute value list,
wherein each of said partial structures is described in said partial structure list using an element ID of an associated parent element described in said internal representation, an attribute ID of an attribute associated with said parent element, an element ID of a child element of said parent element, and a symbol which represents that said parent element have a text content,
wherein said encoded document includes a whole structure data describing a whole structure of said internal representation using said structure IDs, and said text IDs, and
wherein said decoding reproduces said internal representation using said element name list, said attribute name list, and said whole structure data.

7. A computer system comprising:
a first computer; and
a second computer,
wherein said first computer includes:
a first application program generating a first internal representation of a structured document; and
an encoder module encoding said internal representation of a structured document to generate an encoded document,
wherein said second computer includes:
a decoder module performing validation of a structure of said encoded document by using said encoded document and a document structure definition file and by decoding said encoded document to generate a second internal representation of said structured document when no error is found in said validation; and a second application program processing said second internal representation, wherein said encoder module comprises:

an element/attribute name extracting module generating an element name list and an attribute name list through:

extracting an element name from said first internal representation;

determining whether said extracted element name is already registered in said element name list;

additionally registering said extracted element name into said element name list only when said extracted element name is not registered in said element name list;

extracting an attribute name from said first internal representation;

determining whether said extracted attribute name is already registered in said attribute name list; and additionally registering said extracted attribute name into said attribute name list only when said extracted attribute name is not registered in said attribute name list, a text extracting module generating a text content list and an attribute value list through:

extracting a text content from said first internal representation;

determining whether said extracted text content is already registered;

additionally registering said extracted text content into said text content list only when said extracted text content is not registered in said text content list;

extracting an attribution value from said first internal representation;

determining whether said extracted attribution value is already registered in said attribute value list;

additionally registering said extracted attribution value into said attribute value list only when said extracted attribution value is not registered in said attribute value list;

a partial structure extracting module generating a partial structure list through:

extracting a partial structure of said structured document from said first internal representation;

determining whether said extracted partial structure is already registered in said partial structure list; and additionally registering said extracted partial structure into said partial structure list only when said extracted partial structure is not registered in said partial structure list;

a whole document structure extracting module extracting a whole document structure data by using said element name list, said attribute name list, said text content list, said attribute value list, and said partial structure list; and an output module outputting said encoded document so that said encoded document incorporates said element name list, said attribute name list, said text content list, said attribute value list, and said partial structure list, and said whole document structure data, wherein said decoder module includes:

an encoded document decomposing module extracting said element name list, said attribute name list, said text content list, said attribute value list, and said partial structure list, and said whole document structure data from said encoded document;

a text type validation module validating each text content listed in said text content list through determining whether said each text content is in compliance with a type defined in an element type declaration obtained from said document structure definition file by using an element name associated with said each text content as a query, and validating each attribute value listed in said attribution value list through determining whether said each attribution value is in compliance with a type defined in an attribute type declaration obtained from said document structure definition file by using an attribute name associated with said each attribute value as a query;

a partial structure validation module validating each partial structure listed in said partial structure list through determining whether said each partial structure is in compliance with a type defined in said document structure definition file; and an internal representation output module reproducing said second internal representation of said structured document from said element name list, said attribute name list, said text content list, said attribute value list, and said partial structure list, and said whole document structure data.

* * * * *